(12) United States Patent
Kimball

(10) Patent No.: US 7,916,085 B2
(45) Date of Patent: Mar. 29, 2011

(54) METHOD AND APPARATUS FOR LOCATING THE SOURCE OF RADIO FREQUENCY EMISSIONS

(75) Inventor: Steven F. Kimball, Auburn, NH (US)

(73) Assignee: Wisterium Development LLC, Wilmington, DE (US)

( * ) Notice: Subject to any disclaimer, the term of this patent is extended or adjusted under 35 U.S.C. 154(b) by 329 days.

(21) Appl. No.: 11/579,282

(22) PCT Filed: Sep. 21, 2005

(86) PCT No.: PCT/US2005/033862
§ 371 (c)(1),
(2), (4) Date: May 6, 2009

(87) PCT Pub. No.: WO2008/121093
PCT Pub. Date: Oct. 9, 2008

(65) Prior Publication Data
US 2009/0219211 A1    Sep. 3, 2009

Related U.S. Application Data

(60) Provisional application No. 60/621,765, filed on Oct. 25, 2004.

(51) Int. Cl.
*G01S 3/02* (2006.01)
*G01S 3/46* (2006.01)

(52) U.S. Cl. .......................... 342/451; 342/463; 342/465

(58) Field of Classification Search .................. 342/451, 342/463, 465
See application file for complete search history.

(56) References Cited

U.S. PATENT DOCUMENTS

| | | | | |
|---|---|---|---|---|
| 5,570,099 A | * | 10/1996 | DesJardins | 342/378 |
| 5,706,010 A | | 1/1998 | Franke | |
| 5,999,129 A | * | 12/1999 | Rose | 342/394 |
| 6,670,920 B1 | * | 12/2003 | Herrick | 342/378 |
| 7,149,147 B1 | * | 12/2006 | Goldman et al. | 367/88 |
| 7,176,831 B2 | * | 2/2007 | Dibble et al. | 342/357.48 |
| 7,342,536 B2 | * | 3/2008 | Johnson | 342/442 |
| 7,453,400 B2 | * | 11/2008 | Struckman et al. | 342/465 |
| 7,579,989 B2 | * | 8/2009 | Winterling et al. | 342/450 |
| 2003/0176196 A1 | | 9/2003 | Hall et al. | |

* cited by examiner

*Primary Examiner* — Thomas H Tarcza
*Assistant Examiner* — Cassi Galt
(74) *Attorney, Agent, or Firm* — Fitch Even Tabin & Flannery

(57) ABSTRACT

At least two receiver sets are provided. A data processor is in communication with the receiver sets, wherein the data processor tags position data and radio frequency emission data from the receiver sets. A data storage unit is in communication with the data processor and is at least capable of storing tagged data. A processing unit is capable of processing the tagged data. The processing unit defines a search grid within which to search for the source of the radio frequency emission. The processing unit motion compensates the tagged data separately for each point on the grid. The processing unit assigns a value to each grid point based on a phase coherence of the motion compensated data. The processing unit determines a location within the grid having a highest assigned value, thereby determining the source of the radio frequency emission.

25 Claims, 4 Drawing Sheets

METHOD AND APPARATUS FOR LOCATING THE SOURCE OF RADIO FREQUENCY EMISSIONS

CROSS-REFERENCE TO RELATED APPLICATION

This application claims the benefit of U.S. provisional patent application Ser. No. 60/621,765, filed Oct. 25, 2004, and entitled "Method and Apparatus for Locating the Source of Radio Frequency Emissions", which is incorporated herein by reference in its entirety.

FIELD OF THE INVENTION

The present invention relates to methods and apparatus for processing electromagnetic radio frequency signals and, more particularly, to methods and apparatus for locating the source of electromagnetic radio frequency emissions.

BACKGROUND OF THE INVENTION

Electro-magnetic radio frequency emissions can be difficult to locate, especially emissions found above 100 MHz. This is due to the relatively short wavelength of emissions in these frequency bands, which are easily reflected by objects near the emitter or receiver causing multi-path interference. Conventional radio direction finding equipment does not produce accurate direction of arrival measurements for reasonable antenna sizes under these conditions. In addition, conventional radio direction finding equipment typically uses a complex antenna array, which requires careful calibration prior to use.

Thus, a heretofore unaddressed need exists in the industry to address the aforementioned deficiencies and inadequacies.

SUMMARY OF THE INVENTION

Embodiments of the present invention provide a system and method for locating a radio frequency emission source.

Briefly described, in architecture, one embodiment of the system, among others, can be implemented as follows. At least two receiver sets are provided. Each receiver set includes an antenna capable of receiving radio frequency emissions, a radio frequency downconverter, an analog/digital signal converter, and a position-indicating unit. A data processor is in communication with the receiver sets, wherein the data processor receives sampled, down converted radio frequency data from at least one signal received by each of the antennas and position-indicating unit data from at least one receiver set, which the data processor uses to create tagged data. A data storage unit is in communication with the data processor and is at least capable of storing the tagged data. A processing unit is capable of processing the tagged data. The processing unit also defines a search grid within which to search for the source of the radio frequency emission, wherein the search grid comprises a plurality of grid points. The processing unit is capable of motion compensating the tagged data relative to each grid point, wherein the step of motion compensation is separately performed for each grid point. The processing unit is capable of assigning a value to each grid point based on a relative phase coherence of the motion compensated data. The processing unit is capable of determining a location within the search grid having a highest assigned value, thereby determining the source of the radio frequency emission.

The present invention also includes a method for locating a radio frequency emission source. The method includes: receiving the radio frequency emission with at least two receivers; recording data from the received radio frequency emission from at least two receiving points during at least one time interval; recording positional data from at least one receiver; tagging the recorded radio frequency emission data with the positional data; transmitting the tagged data to a processing unit; defining a search grid within which to search for the source of the radio frequency emission, wherein the search grid comprises a plurality of grid points; motion compensating the tagged data relative to each grid point, wherein the step of motion compensation is separately performed for each grid point, thereby creating motion compensated data; assigning a value to each grid point based on the relative phase coherence of the motion compensated data for each time interval; and determining a location within the search grid having a highest assigned value, thereby determining the source of the radio frequency emission.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
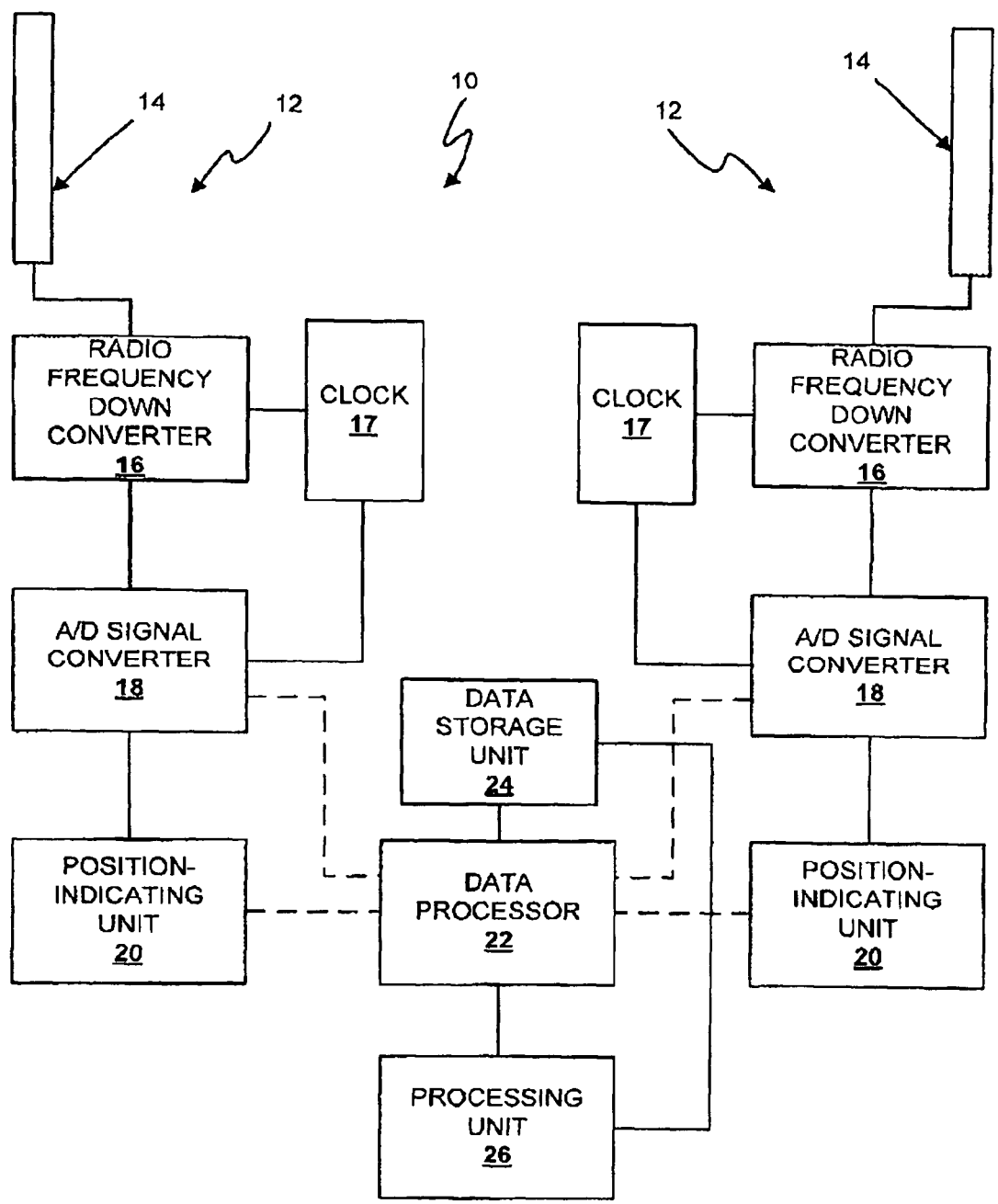
FIG. 1 is a block diagram of a radio frequency emission source locator, in accordance with a first exemplary embodiment of the invention.

FIG. 1 is a block diagram of a radio frequency emission source locator 10, in accordance with a first exemplary embodiment of the invention. At least two receiver sets 12 are provided. Each receiver set 12 includes an antenna 14 capable of receiving radio frequency emissions, a radio frequency down converter 16, an analog/digital signal converter 18, and a position-indicating unit 20. A data processor 22 is in communication with the receiver sets 12, wherein the data processor 22 combines signals from the analog/digital signal converter 18 and the position-indicating unit 20 to produce tagged data. The tagged data includes sampled, down converted radio frequency data (The data are measurements of the antenna voltages translated in frequency and converted from analog voltages to a digital representation by the radio frequency down converter 16 and the analog/digital signal converter 18), from at least one signal received by each of the antennas 14, and position-indicating unit 20 data. A data storage unit 24 is in communication with the data processor 22 and is at least capable of storing tagged data. A processing unit 26 is in communication with the data processor 22 and is capable of processing the tagged data.

The processing unit 26 also defines a search grid (not shown) within which to search for the source of a received radio frequency emission, wherein the search grid comprises a plurality of grid points. The processing unit 26 is capable of motion compensating the tagged data from the receiver sets 12 relative to each grid point, wherein motion compensating is performed to achieve a separate value for each grid point. The processing unit 26 is capable of assigning the value to each grid point based on the motion compensated tagged data. The processing unit 26 is capable of determining a location within the search grid having a highest assigned value, thereby determining the source of the radio frequency emission.

The receiver sets 12 described herein, specifically the antenna 14, the radio frequency down converter 16, the analog/digital signal converter 18, and the position-indicating unit 20, are known to those having ordinary skill in the art for receiving radio signal emissions.

The radio frequency down converter 16 receives a signal from the antenna 14. The radio frequency down converter 16 may apply amplification and filtering as desired and performs a frequency translation to a lower intermediate frequency by mixing the received signal with a sine wave synthesized from a reference clock 17.

The reference clock 17 is designed to be a highly accurate frequency reference such that the frequency difference between the reference clock 17 of each receiver set 12 is minimized. The reference clock 17 may be used by the radio frequency down converter 16 to produce a local oscillator used in the frequency translation process. The frequency-translated signal is then passed to the analog/digital signal converter 18.

The analog/digital signal converter 18 samples the analog signal from the radio frequency down converter 16 and creates a digital representation of the signal. The analog/digital signal converter 18 may provide additional frequency translation and bandwidth reduction using well-known digital signal processing techniques, although the digital samples may be passed directly to the processing unit 26 without any processing. The reference clock 17 may control the rate of sampling and any subsequent digital frequency translation or sample rate reduction.

The position-indicating unit 20 periodically provides a geographic location of the receiver set 12 to the data processor 22. The position-indicating unit 20 may also provide a periodic timing mark. The position-indicating unit 20 may be designed such that the timing marks in each receiver set 12 are synchronized such that they occur simultaneously or in another known and predictable relationship. In addition, the position estimate reported by the position-indicating unit 20 may be the position at the time of the timing mark. Some stationary receiver sets 12 may not require a position-indicating apparatus. Specifically, receiver sets 12 that are stationary over a significant term may simply have position-indicating data stored in a memory for transmittal with the digital signal data, which serves as the position-indicating unit 20.

The data processor 22 receives the digital signal data from the analog/digital signal processor 18 and the data from the position-indicating unit 20. An interface between the data processor 22, the analog/digital signal processor 18, and the position-indicating unit 20 may be designed such that the timing mark from the position-indicating unit 20 is encoded with the digital data from the analog/digital signal converter 18 such that subsequent processing can determine precisely which digital signal sample occurred coincident with the timing mark. The position-indicating unit 20 also sends a current position estimate at the time of the timing mark to the data processor 22. The data processor 22 synchronizes the signal data with the position data using the timing mark to produce tagged data. The tagged data is stored in the data storage unit 24. At the completion of a data collection period, the stored tagged data is transferred from the data storage unit 24 to the processing unit 26. One possible embodiment may have the tagged data sent to the processing unit 26 as it is collected, obviating the data storage unit 24.

Figure 2:
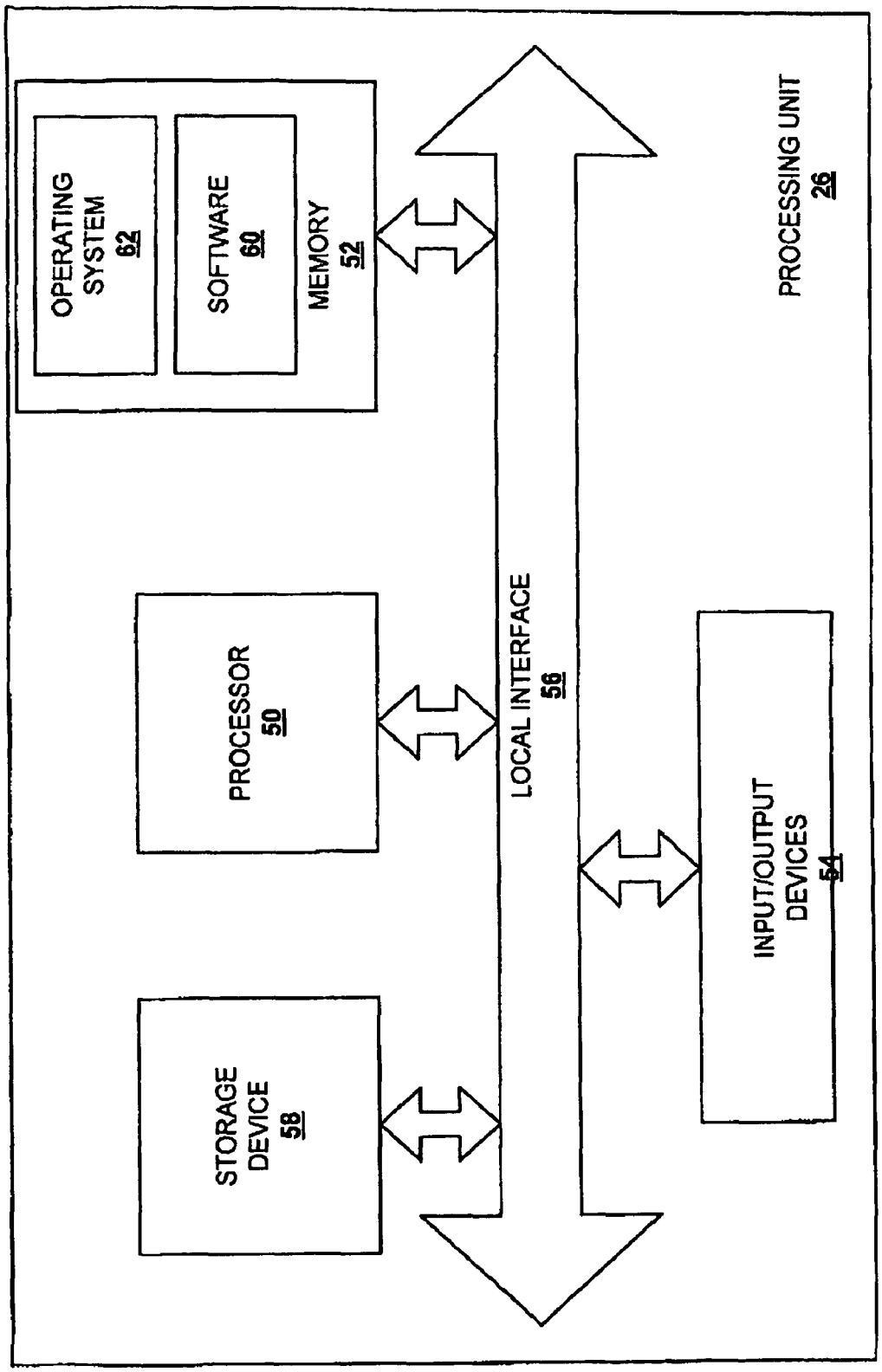
FIG. 2 is a block diagram of a processing unit for the radio frequency emission source locator of FIG. 1, in accordance with the first exemplary embodiment of the invention.

FIG. 2 is a block diagram of the processing unit 26 for the radio frequency emission source locator 10 of FIG. 1, in accordance with the first exemplary embodiment of the invention. The processing unit 26 can be implemented in a combination of software, e.g., firmware, and hardware. In the currently contemplated best mode, the processing unit 26 is implemented partially in hardware and partially in software, as an executable program, and is executed by a special or general purpose digital computer, such as a combination of personal computers (PC; IBM-compatible, Apple-compatible, or otherwise), workstations, minicomputers, or mainframe computers. FIG. 2 illustrates the processing unit 26 as a general purpose computer that can perform functions of the processing unit 26 as defined herein.

Generally, in terms of hardware architecture, as shown in FIG. 2, the processing unit 26 includes a processor 50, a memory 52, and one or more input and/or output (I/O) devices 54 (or peripherals) that are communicatively coupled via a local interface 56. The local interface 56 can be, for example but not limited to, one or more buses or other wired or wireless connections, as is known in the art. The local interface 56 may have additional elements, which are omitted for simplicity, such as controllers, buffers (caches), drivers, repeaters, and receivers, to enable communications. Further, the local interface 56 may include address, control, and/or data connections to enable appropriate communications among the aforementioned components.

The processing unit 26 may also contain a storage device 58 for storing data therein. As an example, in accordance with the first exemplary embodiment of the invention, the data may include processed tagged data. Of course, other information regarding the radio frequency emissions may also be stored within the storage device 58 such as, but not limited to, summed values of radio frequency emission magnitudes along a search grid. An operator of the radio frequency emission source locator 10 or an individual operating one or more of the receiver sets 12 may review this information. Further discussion of this data, in addition to the process of using such data, is included herein.

The processor 50 is a hardware device for executing software 60, particularly that stored in the memory 52. The processor 50 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80 ×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 52 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 52 may incorporate electronic, magnetic, optical, and/or other types of storage media. Note that the memory 52 can have a distributed architecture, where various components are situated remote from one another, but can be accessed by the processor 50.

The software 60 in the memory 52 may include one or more separate programs, each of which comprises an ordered listing of executable instructions for implementing logical functions. In the example of FIG. 2, the software 60 in the memory 52 defines the functionality performed by the processing unit 26. A suitable operating system (O/S) 62 may also be stored within the memory 52. A non-exhaustive list of examples of suitable commercially available operating systems 62 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 62 essentially controls the execution of other computer programs, such as that defined by the software 60 of the processing unit 26, and provides scheduling, input-output control, file and data management, memory management, and communication control and related services.

The I/O devices 54 may include input devices, for example but not limited to, a keyboard, mouse, scanner, microphone, or other input devices. Furthermore, the I/O devices 54 may also include output devices, for example but not limited to, a printer, display, or other output devices. It should be noted that a device for displaying a search grid is preferred in accordance with the first exemplary embodiment of the invention (explained further herein). The I/O devices 54 may further include devices that communicate as both inputs and outputs, for instance but not limited to, a modulator/demodulator (modem; for accessing another device, system, or network), a radio frequency (RF) or other transceiver, a telephonic interface, a bridge, a router, or other communication devices. Specifically, the processing unit 26 may contain a transceiver capable of transmitting to, and receiving from, the data processor 22. In accordance with the first exemplary embodiment of the invention, the processing unit 26 is at least capable of receiving tagged data from the data processor 22.

When the processing unit 26 is in operation, the processor 50 is configured to execute the software 60 stored within the memory 52, to communicate data to and from the memory 52, and to generally control operations of the processing unit 26 pursuant to the software 60, as defined herein. The software 60 and the O/S 62, in whole or in part, but typically the latter, are read by the processor 50, perhaps buffered within the processor 50, and then executed.

When the processing unit 26 is implemented in software, it should be noted that the processing unit 26 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The processing unit 26 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the processing unit 26 is implemented in hardware, the processing unit 26 can be implemented with any or a combination of the following technologies, which are each well known in the art: a discrete logic circuit(s) having logic gates for implementing logic functions upon data signals; an application specific integrated circuit (ASIC) having appropriate combinational logic gates; a programmable gate array(s) (PGA); and a field programmable gate array (FPGA), among others.

The processing unit 26 may further be capable of filtering the tagged data. Filtering the tagged data may be particularly useful if some of the signal data shows anomalies indicative, for instance, of reflected signals or interference. Filtering out the anomalies allows for analysis directed toward reliable signal data.

The receiver sets 12 may be mobile or stationary, although it may be advantageous to have at least one moving receiver set, wherein the moving receiver set is moving while receiving the radio frequency emission, and at least one stationary receiver set, wherein the stationary receiver set is at least stationary while receiving the radio frequency emission. This arrangement of receiver sets 12 may make it easier to measure phase shifts in the radio frequency emission related to a distance between the receiver sets 12 and the radio frequency emission source.

Figure 3:
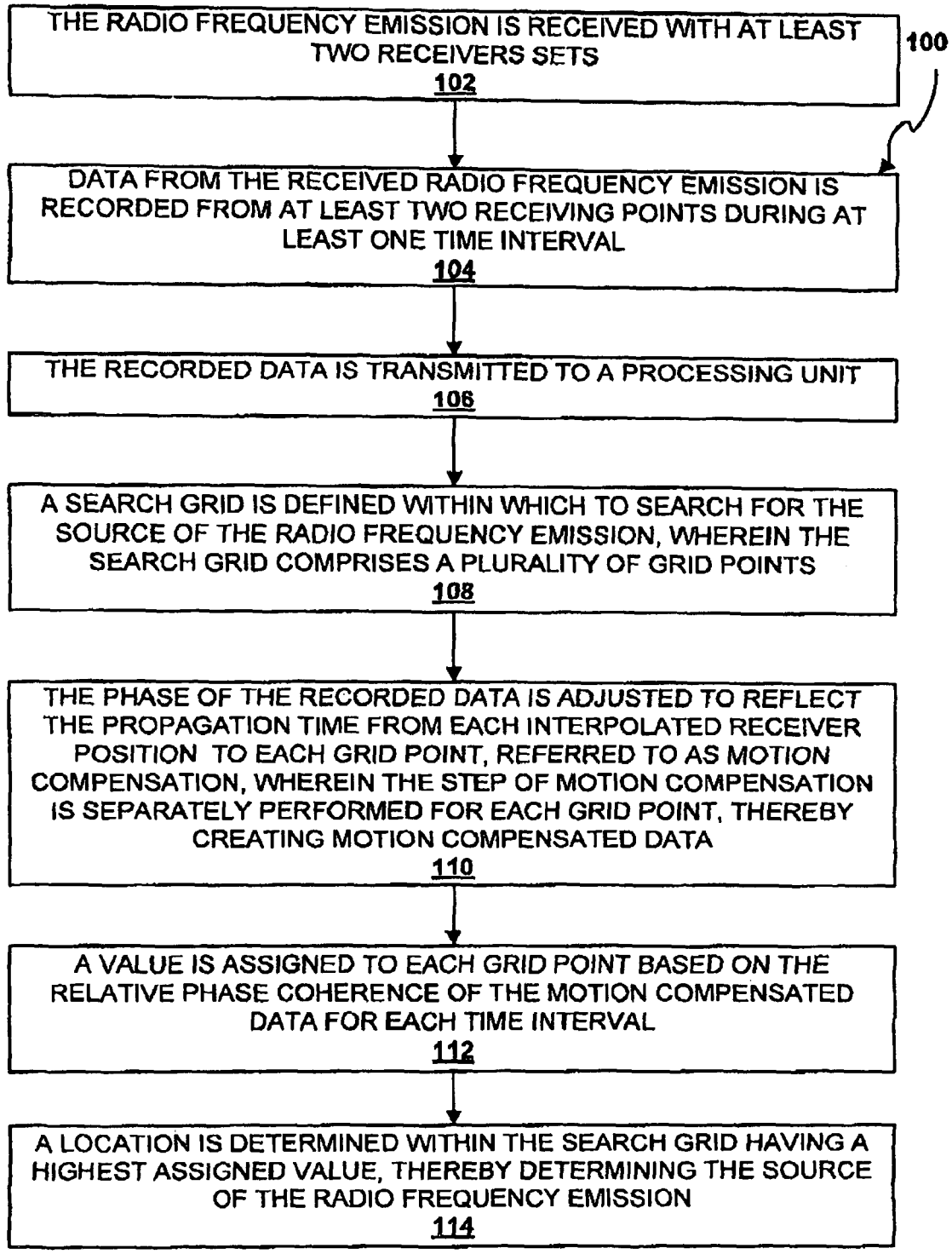
FIG. 3 is a flow chart showing the functionality and operation of a possible implementation of the radio frequency emission source locator of FIG. 1, in accordance with the first exemplary embodiment of the invention.

FIG. 3 is a flow chart 100 showing the functionality and operation of a possible implementation of the radio frequency emission source locator 10 of FIG. 1, in accordance with the first exemplary embodiment of the invention. In this regard, each block represents a module, segment, or step, which comprises one or more instructions for implementing the specified function. It should also be noted that in some alternative implementations, the functions noted in the blocks might occur out of the order, as noted in FIG. 3. For example, two blocks shown in succession in FIG. 3 may in fact be executed substantially concurrently or the blocks may sometimes be executed in the reverse order, depending upon the functionality involved, as will be further clarified herein.

As shown in FIG. 1, the radio frequency emission is received with at least two receivers sets 12 (block 102). Data from the received radio frequency emission is recorded from at least two receiving points during at least one time interval (block 104). The recorded data is transmitted to a processing unit 26 (block 106). A search grid is defined within which to search for the source of the radio frequency emission, wherein the search grid comprises a plurality of grid points (block 108). The phase of the recorded data is adjusted to reflect the propagation time from each interpolated receiver position to each grid point, referred to as motion compensation, wherein the step of motion compensation is separately performed for each grid point, thereby creating motion compensated data (block 110). A value is assigned to each grid point based on the relative phase coherence of the motion compensated data for each time interval (block 112). A location is determined within the search grid having a highest assigned value, thereby determining the source of the radio frequency emission (block 114).

The processing unit 26 receives the tagged data from each receiver set 12. The processing unit 26 then uses the tagged data to determine the location of the source of the radio frequency emission.

The positional data of the receiver sets 12, as well as the signal power spectrum as a function of time, may be displayed to a system operator such that the operator may filter the displayed data according to time or signal frequency. Filtering in accordance with time may be performed to remove portions of the recorded data, which are undesirable, such as when a receiver set 12 intended to be in motion is stationary or when an antenna 14 passes behind a known obstruction to the radio frequency signal. The selection in frequency may be used to separate the target signal from noise or interference by other signals in the recorded data.

A search grid is defined, by the system operator and/or by an automated agent, as the set of points in space where the source could have emanated from. These may be confined to a plane coincident with the Earth's surface if it is known that the source is located on the surface, or it may occupy all three spatial dimensions, i.e. a search cube.

The positional data from each receiver set 12 is interpolated to create a position estimate for each time a sample of the radio frequency emission was recorded. In the preferred embodiment the method of interpolation may be a cubic spline, but alternative methods of creating interpolations such as linear or quadratic splines are contemplated as well as techniques based on filtering, smoothing, or re-sampling, and other techniques known to those having ordinary skill in the art. For each point on the search grid, a distance from the receiver set 12, at each point where a measurement was taken, is calculated. The calculated distance is converted to equivalent wavelengths of an electromagnetic wave for the frequency of radio frequency emission that was received. The phase of the radio frequency emission sample is adjusted to remove a phase-shift effect of the distance by a complex de-rotation by the number of whole and fractional wavelengths of distance. This adjusted sample is referred to as a motion corrected signal. The motion corrected signals from each receiver set 12 are then aligned in time using the timing mark created by each position-indicating unit 20. The time aligned, motion corrected signals are then multiplied together pair-wise, applying a complex conjugate operation to one of the pairs. The product of this operation is referred to as the product signal. The product signal samples are then summed over an interval of time, specified as the coherent integration interval. For each search grid point, complex magnitude, or alternatively, a square of the complex magnitude, is taken and that value is summed with previous values obtained. The time interval is advanced by an amount of time and the summations are repeated. The amount of time advanced may be a fraction of the coherent integration interval (overlapped integration intervals are permissible) or a value equal to or greater than the coherent integration interval. The time interval, for instance, may be approximately two seconds, which allows for sufficient phase coherence analysis of the received radio frequency emission data while being a short enough duration for confidence that the reference clocks 17 in the separate receiver sets 12 remain sufficiently synchronized for the duration of the sample.

In a possible separate embodiment, instead of a coherent integration interval, the product signal may have a low pass filter applied and a magnitude or magnitude squared of the filter output may be periodically taken and summed with the value for a current grid point being examined.

In another possible separate embodiment, all the grid point values obtained for the same coherent integration interval of the same filter output sample may be used to create an estimated probability that the signal emanated from a grid point. The probabilities obtained for each coherent integration interval or filter output sample may then be multiplied together, or the mathematical equivalent by summing the logarithms of the probabilities may be used.

Once the summation has been completed for each grid point, the grid point with the largest sum or greatest probability is reported as the point of emanation of the signal. In addition, the entire search grid may be displayed for the operator to gain insight into the propagation characteristics of the radio frequency emission. The entire search grid may be examined for alternative points whose summation is close to the largest point by some measure. These points may be enclosed in a contour. In the probabilistic embodiment, the contour may surround sufficient points to bring the cumulative probability of the emission arising from an enclosed point to a pre-determined value. The contour may then be displayed to the system operator such that the system operator may determine the likely variability in the accuracy of the reported position estimate.

An example of software code, which, in conjunction with this disclosure, may be used to calculate a source of radio frequency emissions, is attached as Exhibit A. The software code is written for use in conjunction with Matlab software, which is made available by Mathworks, Inc. of Natick, Mass. The software contains programming for at least one embodiment of the invention claimed and discussed herein, although those having ordinary skill in the art will recognize that other software code may be written to accomplish the claimed invention without deviating from the scope of the invention.

Figure 4:
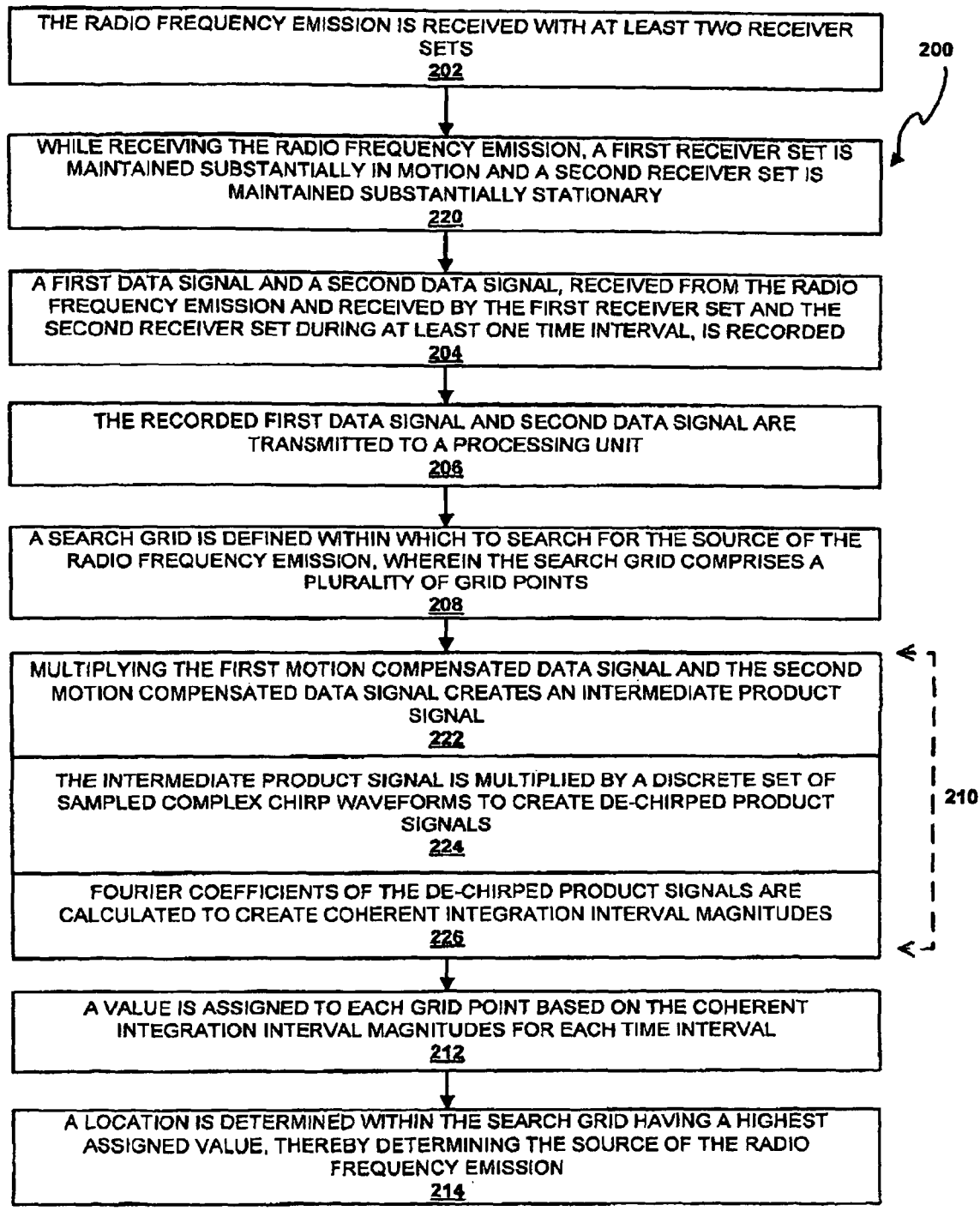
FIG. 4 is a flow chart illustrating a method for locating a source of a radio frequency emission, in accordance with a second exemplary embodiment of the invention.

FIG. 4 is a flow chart illustrating a method 200 for locating a source of a radio frequency emission, in accordance with a second exemplary embodiment of the invention. The radio frequency emission is received with at least two receiver sets 12 (block 202). While receiving the radio frequency emission, a first receiver set 12 is maintained substantially in motion and a second receiver set 12 is maintained substantially stationary (block 220). A first data signal and a second data signal, received from the radio frequency emission and received by the first receiver set 12 and the second receiver set 12 during at least one time interval, is recorded (block 204). The recorded first data signal and second data signal are transmitted to a processing unit 26 (block 206). A search grid is defined within which to search for the source of the radio frequency emission, wherein the search grid comprises a plurality of grid points (block 208). The data signals are motion compensated (block 210). Multiplying the first data signal and the second data signal creates an intermediate product signal (block 222). The intermediate product signal is multiplied by a discrete set of sampled complex chirp waveforms to create de-chirped product signals (block 224). Fourier coefficients of the de-chirped product signals are calculated to create coherent integration interval magnitudes (block 226). A value is assigned to each grid point based on the coherent integration interval magnitudes for each time interval (block 212). A location is determined within the search grid having a highest assigned value, thereby determining the source of the radio frequency emission (block 214).

The processing unit 26 receives the tagged data from each receiver set 12. The processing unit 26 then uses the tagged data to determine the location of the source of the radio frequency emission.

The positional data of the receiver sets 12 as well as the signal power spectrum as a function of time may be displayed to a system operator such that the operator may filter the displayed data according to time or signal frequency. Filtering in accordance with time may be performed to remove portions of the recorded data, which are undesirable, such as when a receiver set 12 intended to be in motion is stationary or when an antenna 14 passes behind a known obstruction to the radio frequency signal. The selection in frequency may be used to separate the target signal from noise or interference by other signals in the recorded data.

A search grid is defined, by the system operator and/or by an automated agent, as the set of points in space where the source could have emanated from. These may be confined to a plane coincident with the surface of the Earth, if it is known that the source is located on the surface, or it may occupy all three spatial dimensions, i.e., a search cube.

Preferably, for this second exemplary embodiment of the invention, one moving receiver set 12 and one stationary receiver set 12, herein identified as the first receiver set 12 and the second receiver set 12, respectively. The second data signal from the second receiver set 12 is filtered to remove as much noise and interference as possible from the radio frequency emission. The filtered second data signal and the first data signal are then aligned in time using the timing mark created by the position-indicating unit 20 of each receiver set 12. The time aligned and filtered first and second data signals are then multiplied together pair-wise, applying a complex conjugate operation to one of the pair. The product of this operation is referred to as the intermediate product signal.

Coherent integration intervals need to be determined. For each coherent integration interval, the positional data from each receiver set 12 is used to create an estimate of the location and velocity (both speed and direction) of the motion of the receiver set 12. The first receiver set 12 is preferably in motion during the coherent integration interval while the second receiver set 12 is stationary. The direction of motion is used to define a new coordinate system where the motion is defined to be along the z-axis. The key innovation to be noted is that the effect of the motion on the phase of the received signal is uniform and invariant to rotations about the axis of motion. This results in a dramatic reduction in the computational complexity of the solution, i.e., the set of points that compose the x,z plane in the new coordinate system include all points in the original x,y,z coordinate system. The effect of the motion of the receiver on the phase of the intermediate product signal is estimated for each point in the x,z plane. This is done by pre-multiplying the intermediate product signal by a set of quantized complex chirp waveforms that compensate for the second order component of the motion's effect on the phase. This is referred to as the de-chirped product signal. The Fourier coefficients of the de-chirped product signals are then computed by well-known methods and the magnitude, or alternatively, the square of the magnitude is stored. These coefficients are referred to as the de-doppler de-chirped product signals. Each coefficient represents the energy received by the moving receiver that is correlated to the waveform received by the stationary receiver from a different point in the x,z plane of the new coordinate system.

Finally, each point of the original search grid is mapped to a new coordinate system defined by motion of the first receiver set 12. The search grid is further reduced to only the range from the receiver set 12 to the grid point and the offset between the receiver set 12 and the grid point in the new z-axis direction. These new coordinates are then mapped into a doppler offset and a chirp offset, which are used to index into the de-doppler de-chirped product signals to select the energy from that point in space. Once the search grid has been filled for one coherent interval it is summed with the results obtained for the previous coherent intervals. This process is repeated for each coherent interval.

All the grid point values obtained for the same coherent integration interval may be used to create an estimated probability that the signal emanated from each grid point. The probabilities obtained for each coherent integration interval or filter output sample may then be multiplied together, or the mathematical equivalent by summing the logarithms of the probabilities can be used.

For separate time intervals, it may be advantageous for the first receiver set 12 to move in dissimilar ways. More useful data may be retrieved from this process, in part, because dissimilar new coordinate systems using a dissimilar x,z plane will be developed as a result of dissimilar paths of motion from the first receiver set 12. The dissimilar x,z plane is more reliable for the purpose of identifying the radio frequency emission source. In contrast, a similar x,z plane produce very similar data that tends to replicate results, including errors, and produce less reliable data for the purpose of identifying the radio frequency emission source. The dissimilar motion of the first receiver set 12 in separate time intervals may involve two non-colinear paths of motion between two separate time intervals.

Once the summation has been completed for each grid point, the grid point with the largest sum or greatest probability is reported as the point of emanation of the signal. In addition, the entire search grid may be displayed for the operator to gain insight into the propagation characteristics of the radio frequency emission. The entire search grid may be examined for alternative points whose summation is close to the largest point by some measure. These points may be enclosed in a contour. In the probabilistic embodiment, the contour may surround sufficient points to bring the cumulative probability of the emission arising from an enclosed point to a pre-determined value. The contour may then be displayed to the system operator such that the system operator may determine the likely variability in the accuracy of the reported position estimate.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for locating a source of a radio frequency emission, the method comprising:
receiving the radio frequency emission with at least two receivers during movement of at least one of the at least two receivers;
recording data from the received radio frequency emission from at least two receiving points during at least one time interval to create recorded data;
recording positional data of at least one of the receivers;
tagging the recorded data of the radio frequency emission and the positional data to create tagged data to determine a proximate position of the at least one receiver at the at least one time interval during which the radio frequency emission was received;
transmitting the tagged data to a processing unit;
defining a search grid within which to search for the source of the radio frequency emission, wherein the search grid comprises a plurality of grid points;
motion compensating the tagged data, thereby creating motion compensated data;
assigning a value to individual ones of the plurality of grid points based on a relative phase coherence of the motion compensated data for the at least one time interval; and
determining a location within the search grid having a highest assigned value, thereby determining the source of the radio frequency emission;
wherein the motion compensating further comprises:
identifying a first data signal from a stationary receiver of the at least two receivers and a second data signal from a moving receiver of the at least two receivers;
multiplying the first data signal and the second data signal to create an intermediate product signal;
multiplying the intermediate product signal by a set of quantized complex chirp waveforms to create de-chirped product signals; and
calculating Fourier coefficients of the de-chirped product signals to create coherent integration interval magnitudes.

2. The method of claim 1, wherein the motion compensating further comprises modifying a phase of the tagged data based on the positional data of the at least one receiver relative to individual ones of the plurality of grid points, wherein the motion compensating is separately performed for the individual ones of the plurality of grid points, thereby creating motion compensated data.

3. The method of claim 1, wherein the recording data further comprises recording data from a plurality of the at least one time interval, wherein the motion compensating the tagged data further comprises motion compensating the tagged data for individual ones of the plurality of the at least one time interval and summing the relative phase coherence for the individual ones of the plurality of grid points to create the values assigned to the individual ones of the plurality of grid points.

4. The method of claim 1, further comprising filtering out a portion of the received radio frequency emission.

5. The method of claim 4, wherein the filtering further comprises filtering out specific radio frequencies from the received radio frequency emission.

6. The method of claim 4, wherein the filtering further comprises filtering out at least a portion of the at least one time interval.

7. The method of claim 1, wherein the at least one time interval is approximately two seconds.

8. The method of claim 1, wherein the determining the location further comprises identifying a grouping of grid points that have the highest assigned values, thereby determining the source of the radio frequency emission.

9. The method of claim 1, wherein the assigning a value to individual ones of the plurality of grid points further comprises assigning coherent integration interval magnitudes to the individual ones of the plurality of grid points.

10. The method of claim 1, wherein the defining a search grid further comprises mapping the search grid to a new coordinate system defined by motion of the moving receiver.

11. The method of claim 1, wherein the motion compensating is performed for at least a first time interval and a second time interval wherein a first motion of the moving receiver during the first time interval is non-colinear with respect to a second motion of the moving receiver during the second time interval.

12. A system for locating a source of a radio frequency emission, the system comprising:
means for receiving the radio frequency emission from at least two separate locations at least partially contemporaneously during movement of at least one of the at least two separate locations;
means for recording data from the received radio frequency emission during at least one time interval;
means for defining a plurality of grid points within which to search for the source of the radio frequency emission;
means for motion compensating the data relative to individual ones of the plurality of grid points, thereby creating motion compensated data;
means for assigning a value to the individual ones of the plurality of grid points based on the motion compensated data for the at least one time interval; and
means for identifying a grouping of grid points that have the highest assigned values, thereby determining the source of the radio frequency emission;
wherein the means for motion compensating further comprises:
means for identifying a first data signal from a stationary receiver of the means for receiving and a second data signal from a moving receiver of the means for receiving;
means for multiplying the first data signal and the second data signal to create an intermediate product signal;
means for multiplying the intermediate product signal by a set of quantized complex chirp waveforms to create de-chirped product signals; and
means for calculating Fourier coefficients of the de-chirped product signals to create coherent integration interval magnitudes.

13. The system of claim 12, further comprising means for filtering out a portion of the received radio frequency emission.

14. The system of claim 12, wherein the means for recording data further comprises means for recording data from a plurality of the at least one time interval, wherein the means for motion compensating the recorded data further comprises means for motion compensating the recorded data for individual ones of the plurality of the at least one time interval and means for summing the motion compensated data to create the values assigned to the individual ones of the plurality of grid points.

15. The system of claim 12, wherein the means for defining a plurality of grid points further comprises means for confining the plurality of grid points substantially to a plane approximately coincident with the Earth's surface.

16. A radio frequency emission source locator, comprising:
  at least two receiver sets, individual ones of the at least two receiver sets comprising:
    an antenna capable of receiving radio frequency emissions;
    a radio frequency down converter;
    an analog/digital signal converter; and
    a position-indicating unit;
    wherein at least one of the at least two receiver sets is configured to move relative to another receiver set;
  a data processor configured to be in communication with the at least two receiver sets wherein the data processor is configured to receive down converted radio frequency data from at least one signal received by the antenna and position-indicating unit data from the at least two receiver sets and wherein the data processor is configured to combine the down converted radio frequency data and the position-indicating unit data to create tagged data; and
  a processing unit configured to process the tagged data, the processing unit configured to:
    define a search grid within which to search for a source of the radio frequency emissions, wherein the search grid comprises a plurality of grid points;
    motion compensating the tagged data relative to individual ones of the plurality of grid points, wherein motion compensation is performed to achieve a separate value for the individual ones of the plurality of grid points;
    assigning the value to the individual ones of the plurality of grid points based on a phase coherence of the motion compensated data; and
    determining a location within the search grid having a highest assigned value, thereby determining the source of the radio frequency emission;
    wherein the motion compensating further comprises:
      identifying a first data signal from a stationary receiver of the at least two receiver sets and a second data signal from a moving receiver of the at least two receiver sets;
      multiplying the first data signal and the second data signal to create an intermediate product signal;
      multiplying the intermediate product signal by a set of quantized complex chirp waveforms to create de-chirped product signals; and
      calculating Fourier coefficients of the de-chirped product signals to create coherent integration interval magnitudes.

17. The radio frequency emission source locator of claim 16, wherein the processing unit is further configured to filter the tagged data.

18. The radio frequency emission source locator of claim 16, wherein the tagged data further comprises time data associated with a time the signal is received by the antenna.

19. The radio frequency emission source locator of claim 16, wherein the at least two receiver sets further comprise at least one mobile receiver set and at least one stationary receiver set.

20. A non-transitory computer readable medium including instructions that cause a computing device to perform operations comprising:
  recording data from a received radio frequency emission received at at least two receivers during at least one time interval during which at least one of the at least two receivers moves relative to another receiver;
  recording positional data of at least one of the receivers to create recorded data;
  tagging the recorded data of the radio frequency emission and the positional data to create tagged data to determine a proximate position of the at least one receiver at the at least one time interval during which the radio frequency emission was received;
  defining a search grid within which to search for a source of the radio frequency emission, wherein the search grid comprises a plurality of grid points;
  motion compensating the tagged data, thereby creating motion compensated data;
  assigning a value to individual ones of the plurality of grid points based on a relative phase coherence of the motion compensated data for the at least one time interval; and
  determining a location within the search grid having a highest assigned value, thereby determining the source of the radio frequency emission;
    wherein the motion compensating further comprises:
      identifying a first data signal from a stationary receiver of the at least two receivers and a second data signal from a moving receiver of the at least two receivers;
      multiplying the first data signal and the second data signal to create an intermediate product signal;
      multiplying the intermediate product signal by a set of quantized complex chirp waveforms to create de-chirped product signals; and
      calculating the Fourier coefficients of the de-chirped product signals to create coherent integration interval magnitudes.

21. The non-transitory computer readable medium of claim 20, wherein the motion compensating further comprises modifying a phase of the tagged data based on the positional data of the at least one receiver relative to individual ones of the plurality of grid points, wherein the motion compensating is separately performed for the individual ones of the plurality of grid points, thereby creating motion compensated data.

22. The non-transitory computer readable medium of claim 20, wherein the recording data further comprises recording data from a plurality of the at least one time interval, wherein the motion compensating the tagged data further comprises motion compensating the tagged data for individual ones of the plurality of the at least one time interval and summing the relative phase coherence for the individual ones of the plurality of grid points to create the values assigned to the individual ones of the plurality of grid points.

23. The non-transitory computer readable medium of claim 20, wherein the assigning a value to individual ones of the plurality of grid points further comprises assigning coherent integration interval magnitudes to the individual ones of the plurality of grid points.

24. The non-transitory computer readable medium of claim 20, wherein the defining a search grid further comprises mapping the search grid to a new coordinate system defined by motion of the moving receiver.

25. The non-transitory computer readable medium of claim 20, wherein the motion compensating is performed for at least a first time interval and a second time interval wherein a first motion of the moving receiver during the first time interval is non-colinear with respect to a second motion of the moving receiver during the second time interval.

* * * * *